(12) United States Patent
Chen

(10) Patent No.: US 6,266,861 B1
(45) Date of Patent: Jul. 31, 2001

(54) DEVICE FOR MOUNTING BEARINGS ONTO A SHAFT

(76) Inventor: Yu-Lin Chen, No. 539-21 Chung-Shan Rd., Chingshui Town, Taichung Hsien (TW)

(*) Notice: Subject to any disclaimer, the term of this patent is extended or adjusted under 35 U.S.C. 154(b) by 0 days.

(21) Appl. No.: 09/460,408

(22) Filed: Dec. 13, 1999

(51) Int. Cl.[7] ................................... B23P 19/04
(52) U.S. Cl. ...................... 29/261; 29/252; 29/258
(58) Field of Search ................ 29/259, 266, 261, 29/262

(56) References Cited

U.S. PATENT DOCUMENTS

| | | | |
|---|---|---|---|
| 3,908,258 | * 9/1975 | Barty | 29/252 |
| 3,964,149 | * 6/1976 | Hugh | 29/258 |
| 4,649,615 | * 3/1987 | Hundley | 29/261 |
| 5,233,740 | * 8/1993 | Chen | 29/252 |
| 5,419,027 | * 5/1995 | McPeak et al. | 29/252 |
| 5,557,833 | * 9/1996 | Pool | 29/261 |
| 5,896,639 | * 4/1999 | Chen | 29/261 |

* cited by examiner

Primary Examiner—Joseph J. Hail, III
Assistant Examiner—Daniel Shanley
(74) Attorney, Agent, or Firm—Rosenberg, Klein & Lee

(57) ABSTRACT

A device for mounting a bearing onto a shaft includes a tube connected to the shaft and having an open end. Three grooves are defined longitudinally in the tube and communicate with the open end. A pushing member has three wings extending radially outward therefrom and the wings are movably received in the grooves. Each of the wings has a rod slidably and perpendicularly connected thereto so as to contact a surface of the bearing. A hydraulic pushing rod pushes the pushing member toward the shaft so that the bearing is moved on the shaft.

12 Claims, 15 Drawing Sheets

DEVICE FOR MOUNTING BEARINGS ONTO A SHAFT

FIELD OF THE INVENTION

The present invention relates to a device for mounting bearings on a shaft. The device includes a pushing member movably engaged with a tube fixedly connected to the shaft. Three rods are connected between the pushing member and the bearing, the pushing member is moved by a hydraulic tool to move the bearing along the shaft.

BACKGROUND OF THE INVENTION

FIG. 1 shows a conventional bearing puller which is used to pull a bearing from a shaft. However, there is a lack for providing a tool to easily mount bearings onto a shaft. A conventional way to mount bearings to a shaft is illustrated in FIG. 2, wherein the bearing 100 is first mounted to an end of the shaft 101, and the operator uses wood or plastic beetles 102 to hit the bearing 100 so that the bearing 100 is moved inch by inch to be located to a desired position on the shaft 101. It takes a lot of time and cannot precisely position the bearing 100 onto the shaft 101. Besides, the bearing 100 could be damaged. Some hydraulic machines are used to push bearings onto a shaft. These hydraulic machines can only to engage with bearings that have specific specifications and the machines are expensive.

The present invention intends to provide a device to mount bearings onto a shaft, the device can engage the bearings without size limitations and involves simple structure.

SUMMARY OF THE INVENTION

In accordance with one aspect of the present invention, there is provided a device for mounting bearings onto a shaft. The device comprises a tube having a closed bottom and an open end. At least two grooves are defined longitudinally in the tube and communicate with the open end. An engaging means connects the closed bottom of the tube and the shaft. A pushing member has at least two wings which are movably received in the at least two grooves. Each of the at least two wings having a rod contacting the bearing. The pushing member is pushed by a hydraulic pushing rod to move the bearing on the shaft.

The object of the present invention is to provide a device that pushes bearings onto a shaft wherein the device can be used to push bearings having different sizes.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
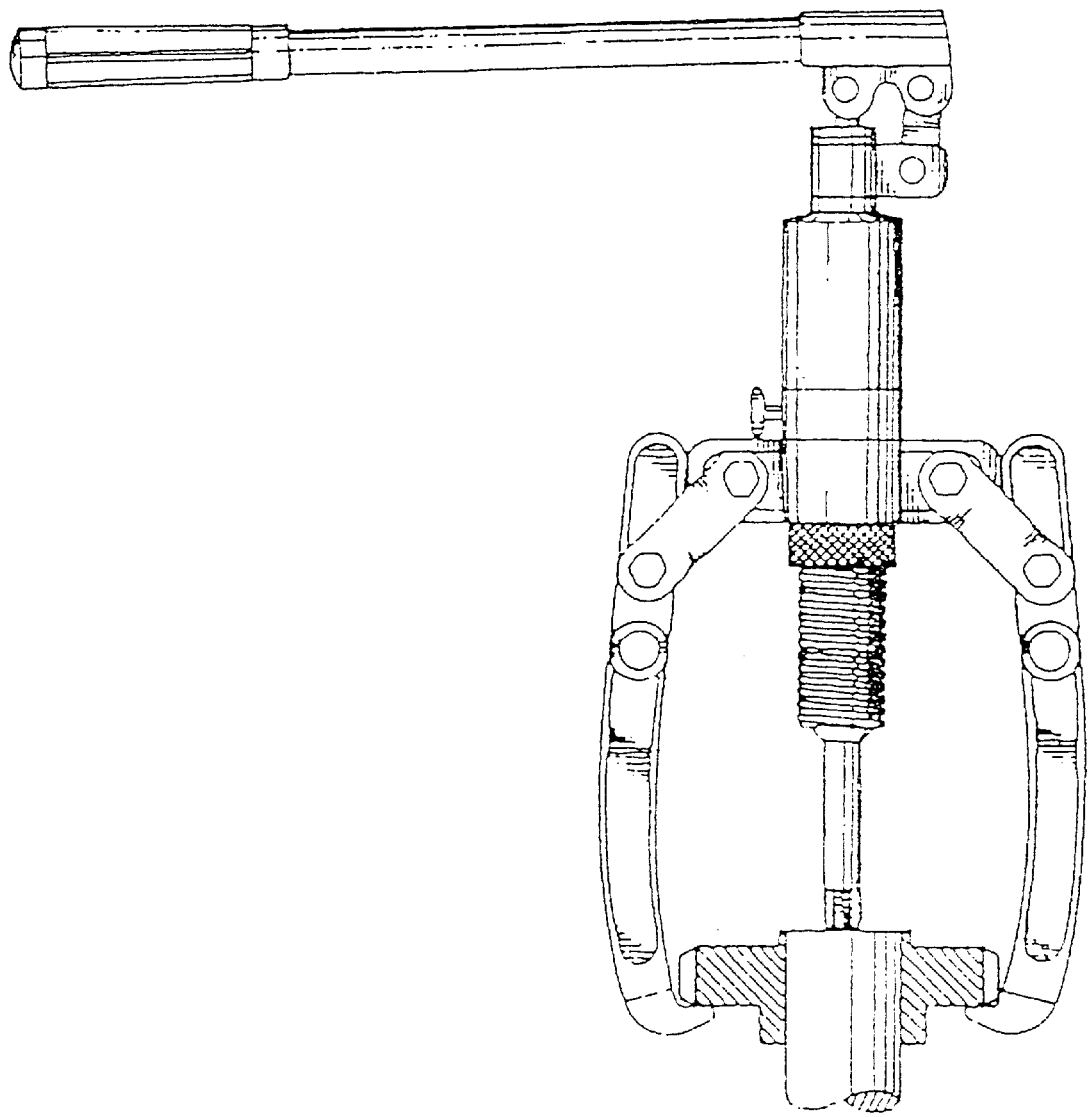
FIG. 1 shows a conventional bearing puller.
Figure 2:
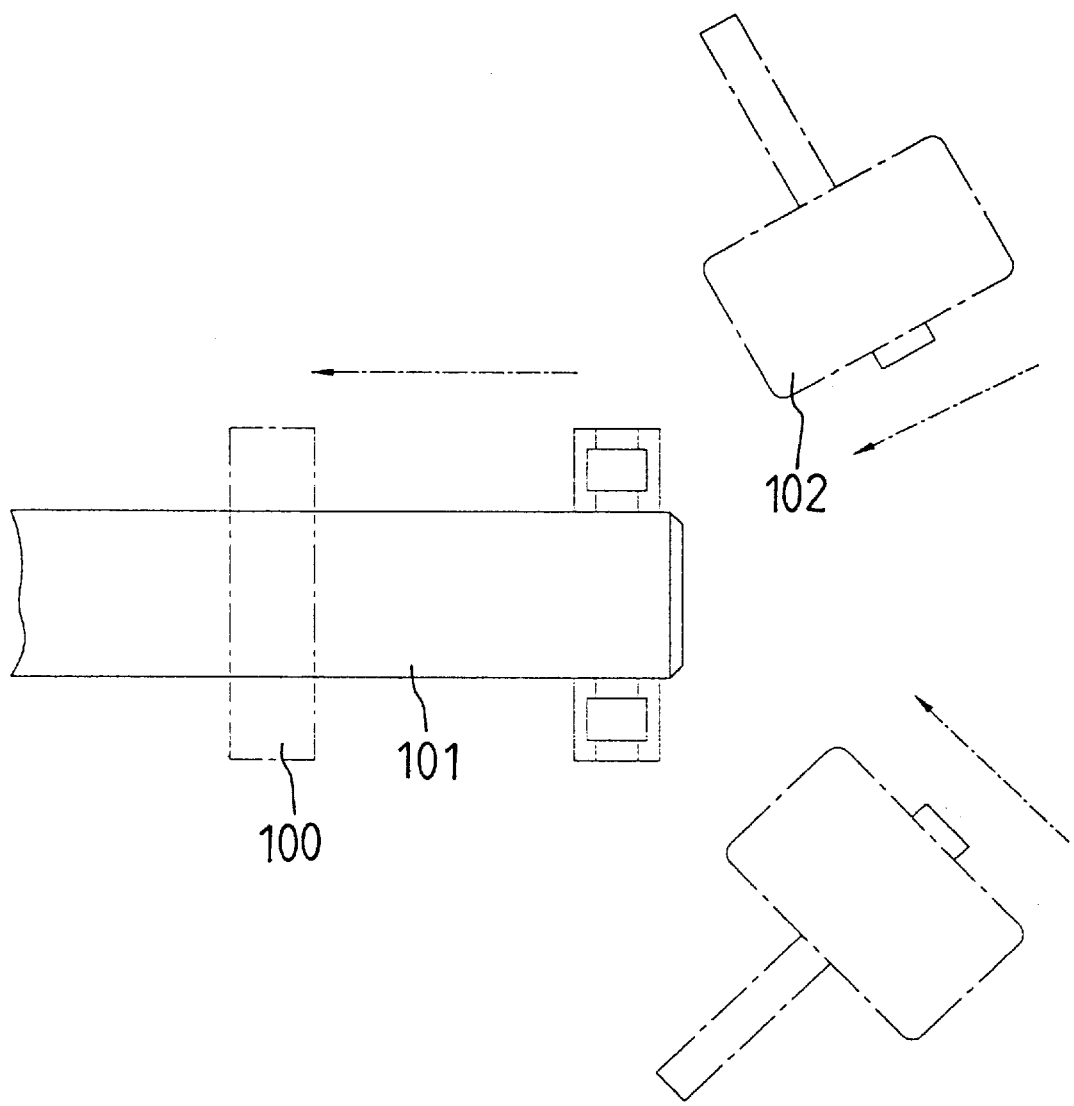
FIG. 2 illustrates a bearing is conventionally mounted to a shaft by beetles.
Figure 3:
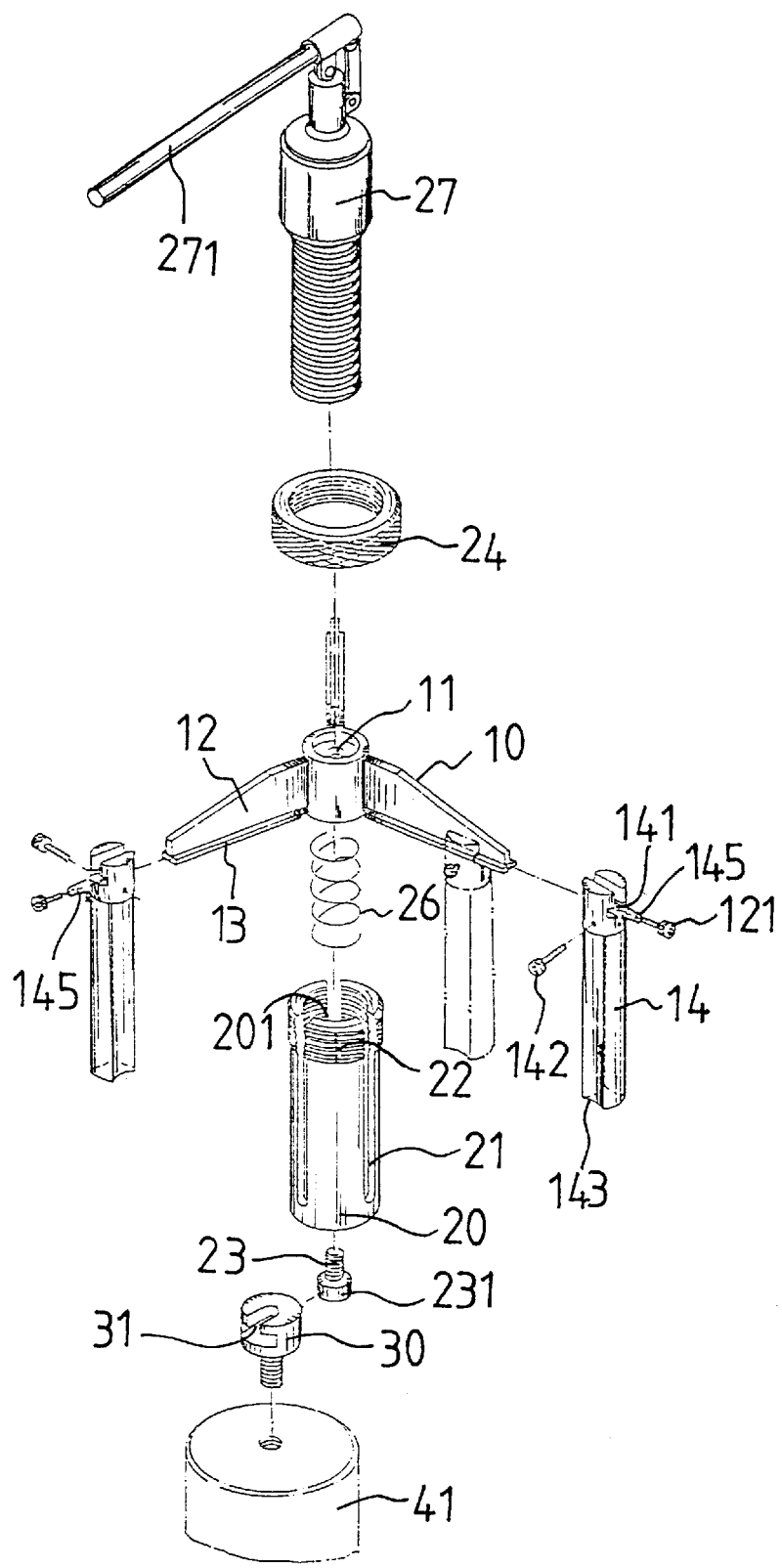
FIG. 3 is an exploded view to show the device for mounting a bearing onto a shaft in accordance with the present invention.
Figure 4:
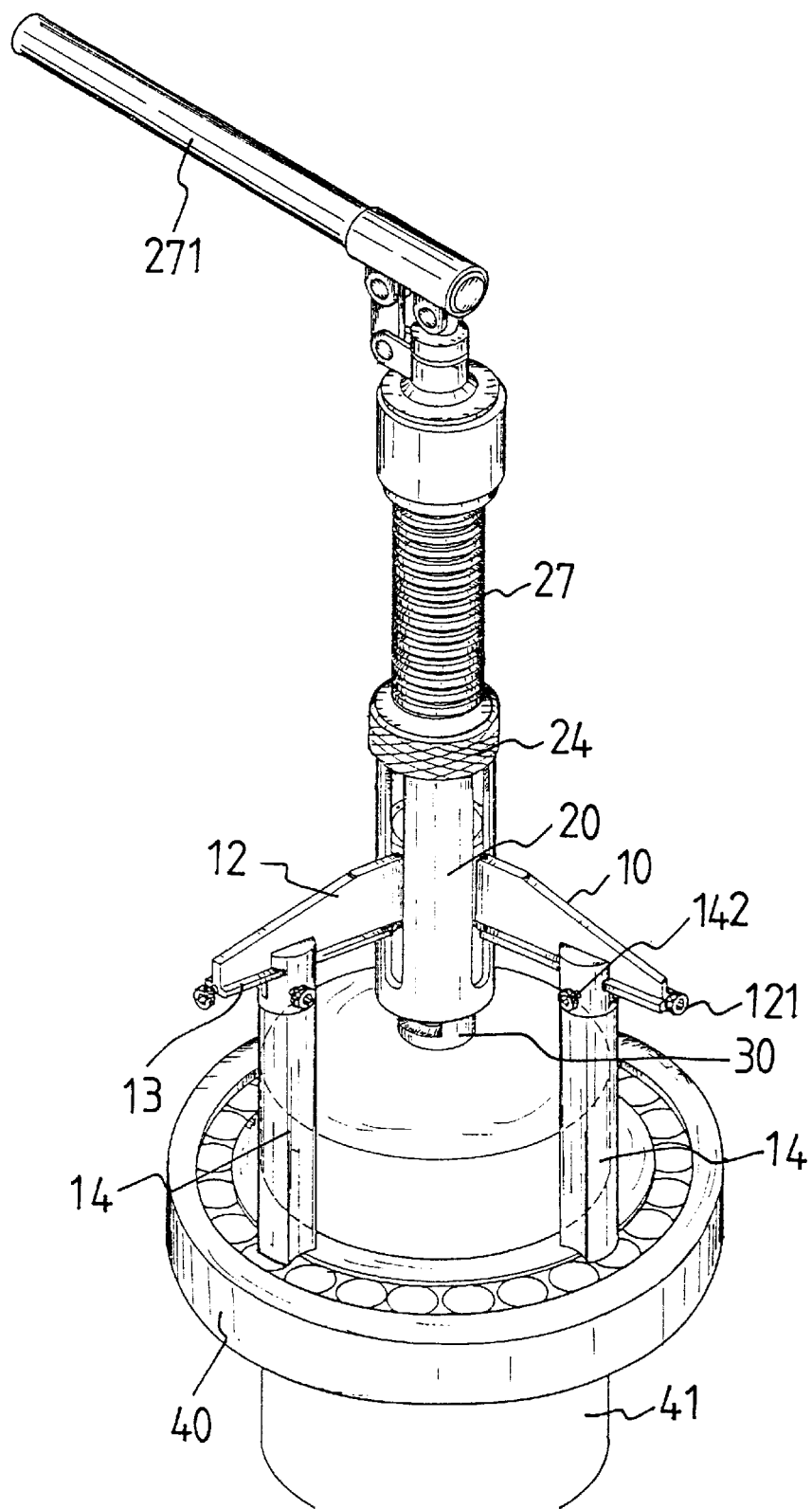
FIG. 4 is a perspective view to show the device of the present invention that pushes a bearing onto a shaft.
Figure 8:
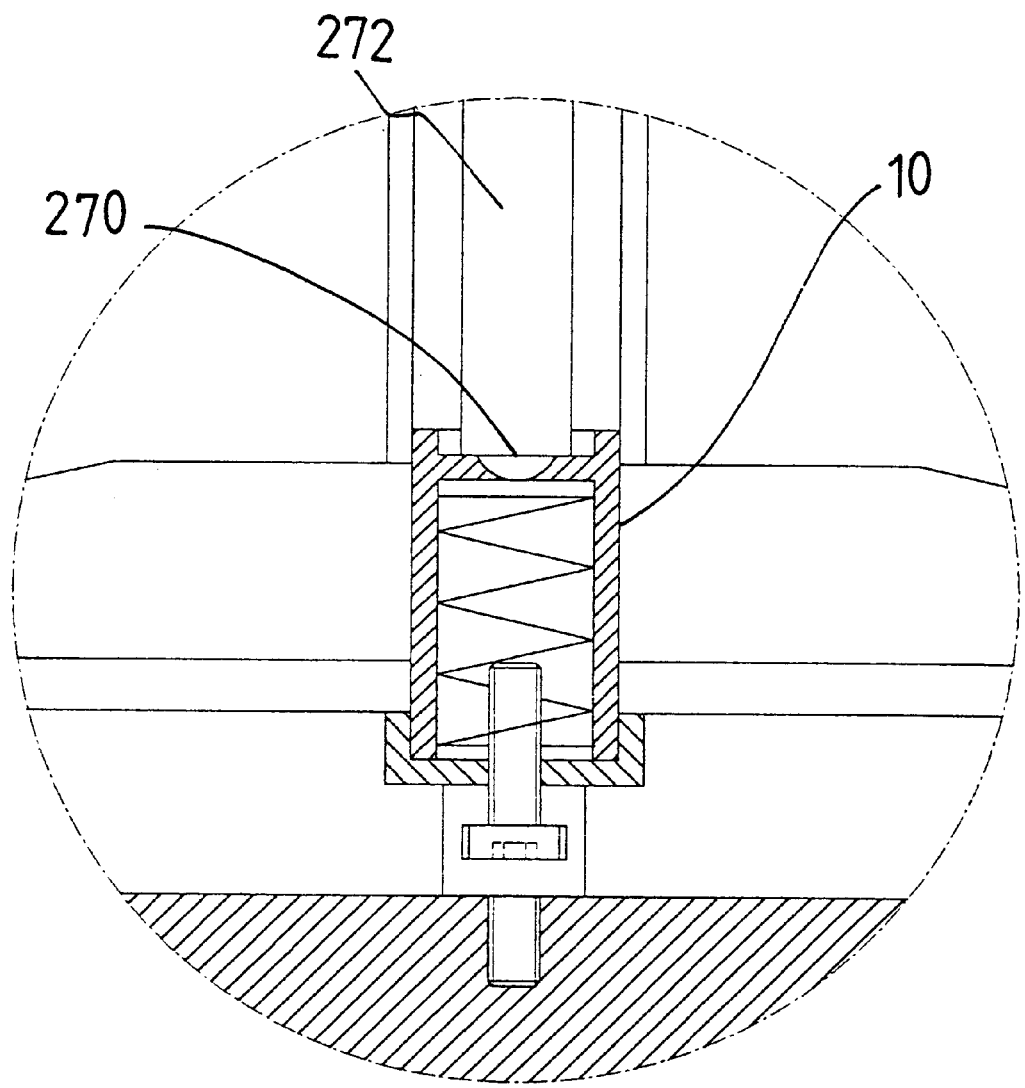
FIG. 8 shows that the pushing rod of the hydraulic tool has a rounded end which is engaged with the dent in the pushing member.

Referring to FIGS. 3, 4 and 8, the device for mounting bearings onto a shaft in accordance with the present invention comprises a tube 20 having a closed bottom and an open end which has a threaded outside 22 and a threaded inside 201. Three grooves 21 are defined longitudinally in the tube 20 and communicate with the open end. An engaging means is connected between the closed bottom of the tube 20 and the shaft 41. The engaging means includes a first part 23 connected to the closed bottom of the tube 20, the first part 23 having a head 231, and a second part 30 threadedly connected to the shaft 41. The second part 30 has a concavity 31 defined radially therein so as to receive the head 231 in the concavity 31.

Figure 5:
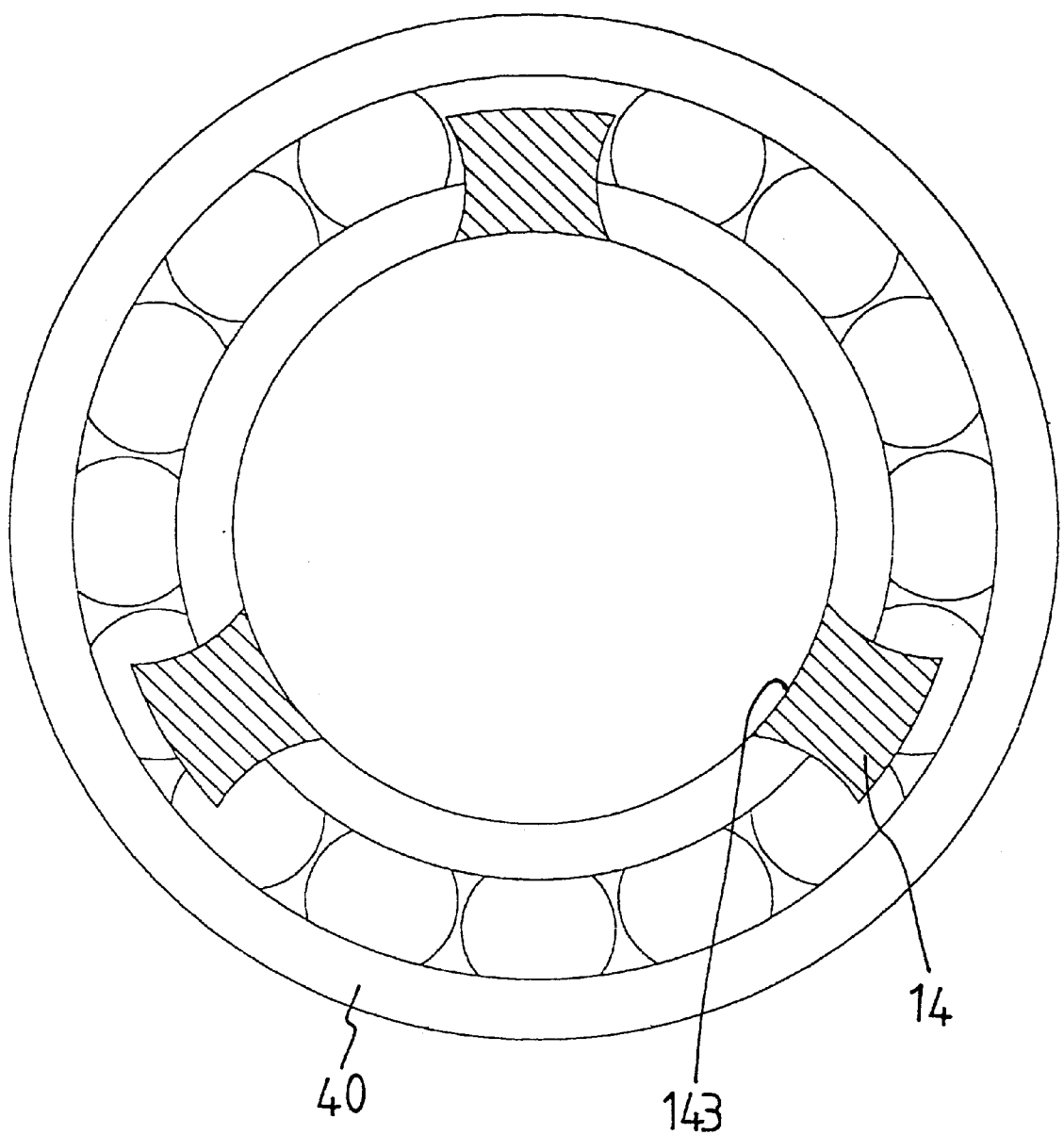
FIG. 5 shows that each rod extending from the pushing member has a curved inside so as to engage with the bearing.
Figure 6:
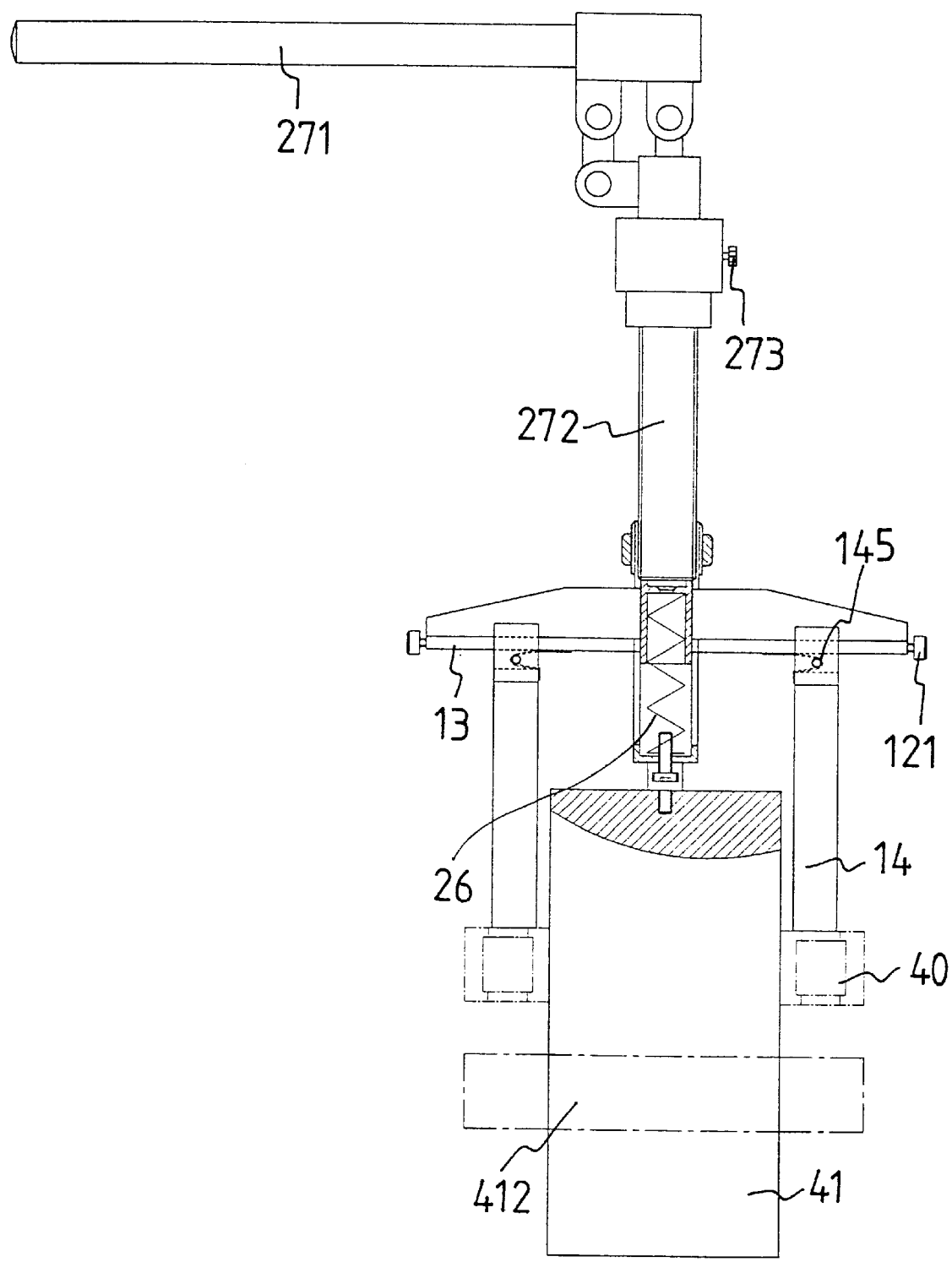
FIG. 6 is a cross-sectional view to show the device of the present invention pushing a bearing on a shaft.
Figure 7:
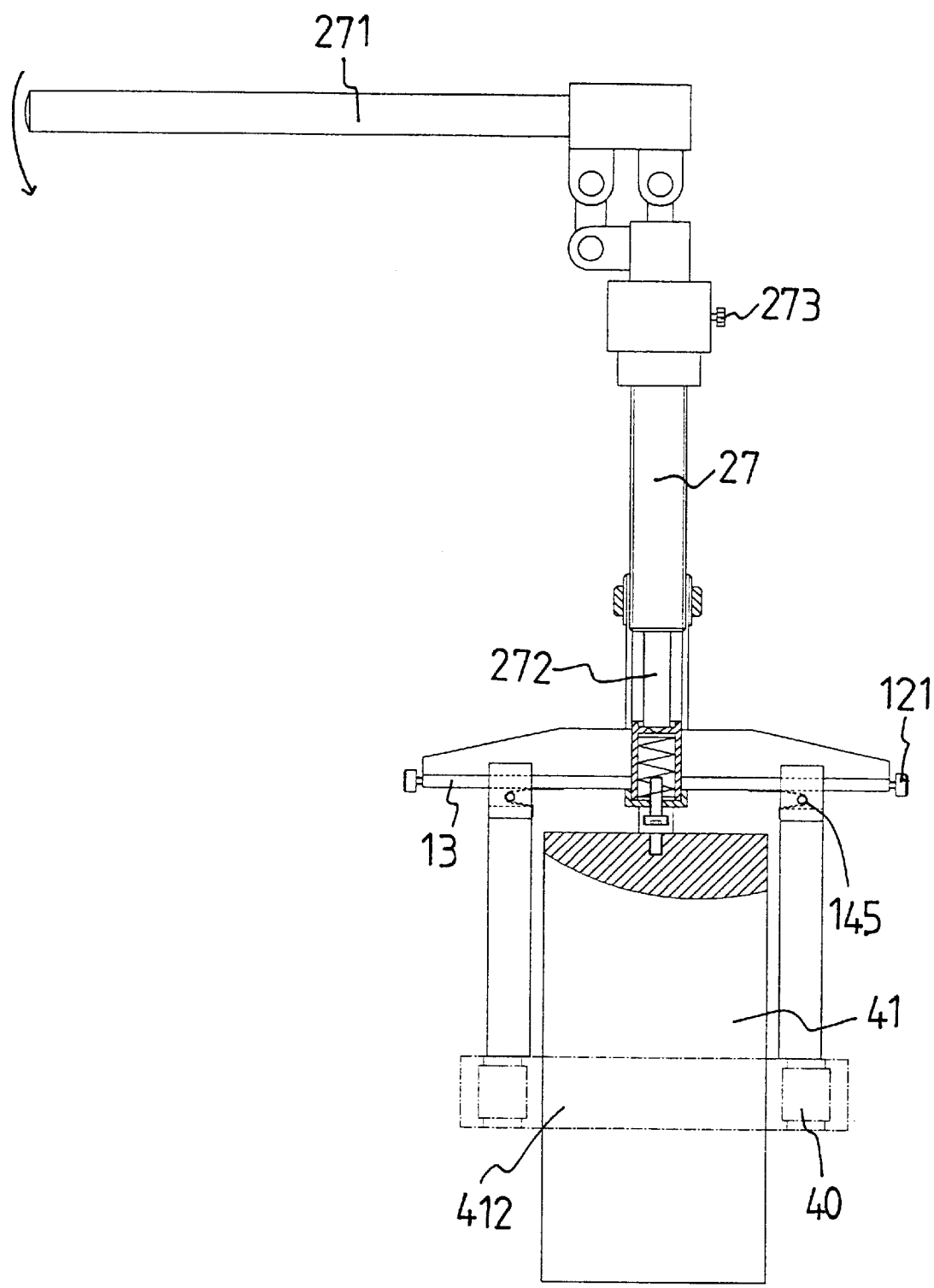
FIG. 7 shows that the pushing member is pushed by the device of the present invention and the bearing is moved by the rods of the pushing member.
Figure 9:
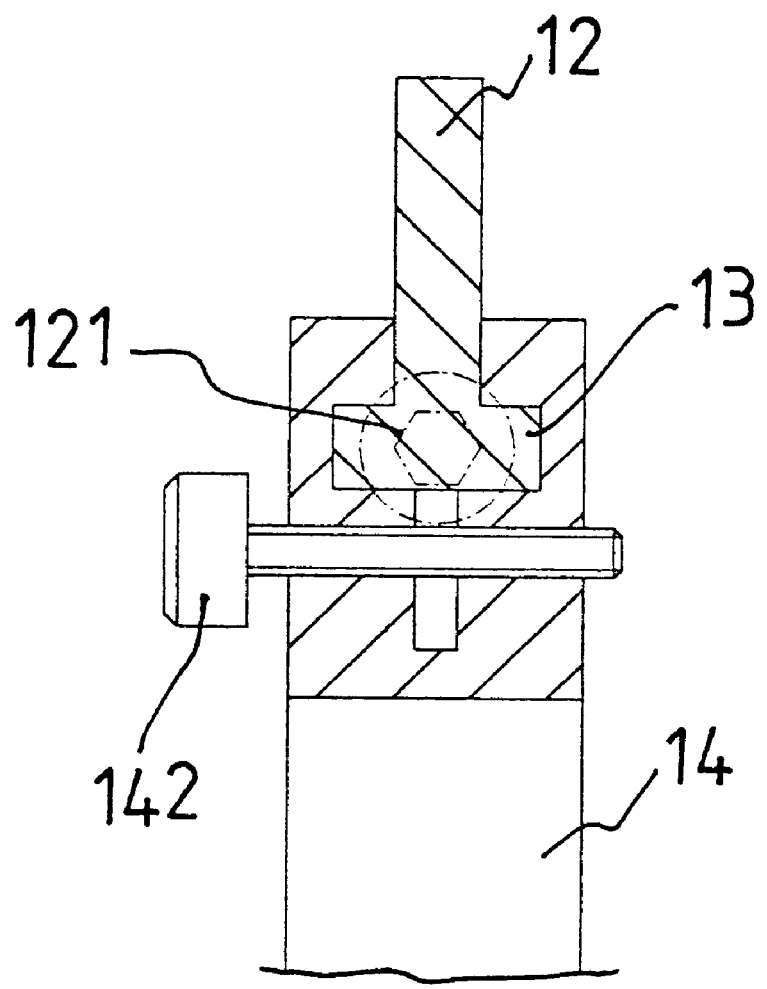
FIG. 9 shows that a bolt extends through the two partitions separated by a slot of each rod so as to clamp the flanges of the wing.
Figure 14:
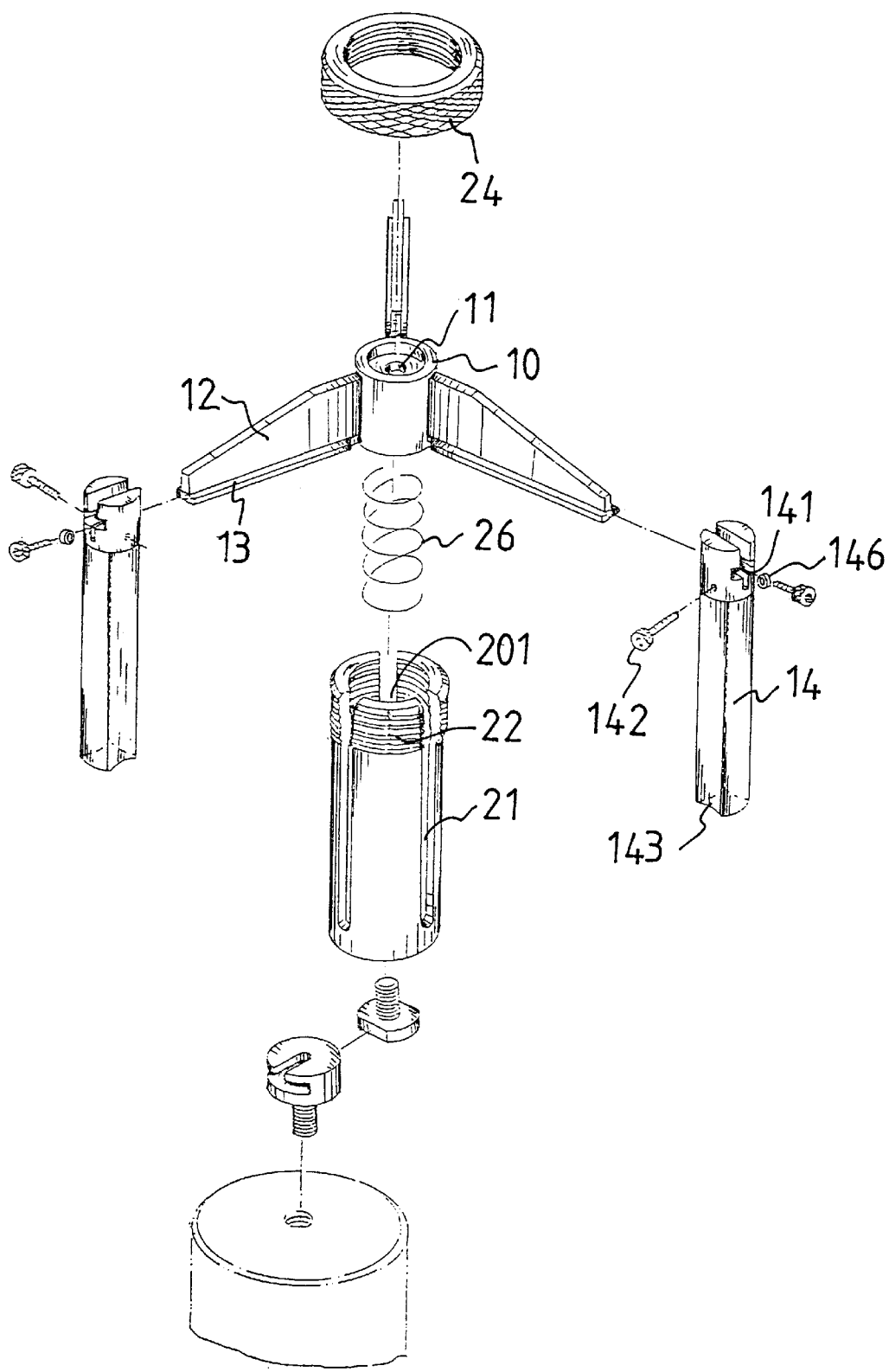
FIG. 14 is an exploded view to show another embodiment of the biasing member received between a bottom of the flanges and a bottom defining the slot of each of the rods.
Figure 15:
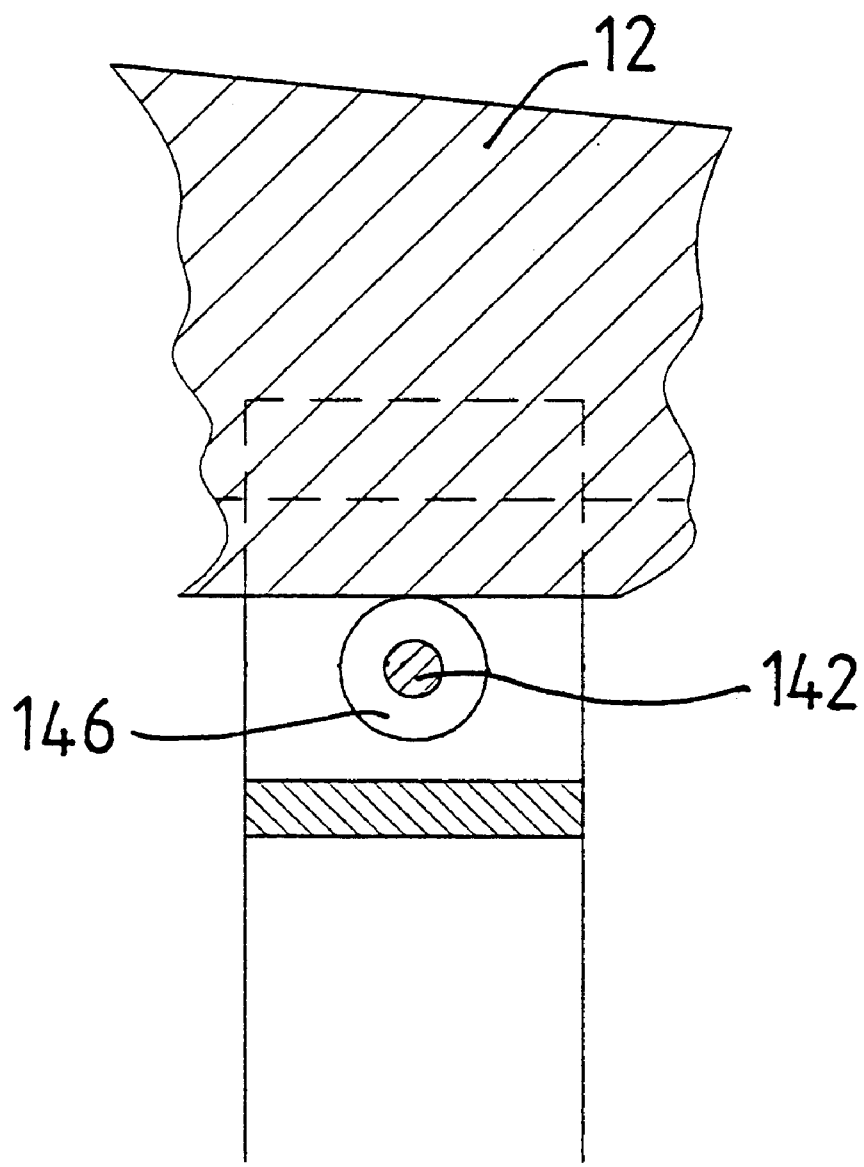
FIG. 15 is a cross sectional view to show the biasing member as shown in FIG. 14 and the bottom of the flanges of the wing.

A pushing member 10 has a top in which a dent 11 is defined and three wings 12 extend radially outward from the pushing member 10. The three wings 12 are movably received in the grooves 21. A spring 26 is urged between the pushing member 10 and the closed bottom of the tube 20. Each of the wings 12 has two flanges 13 extending laterally from two sides thereof and each of the rods 14 has a slot defined in a top thereof. Two side recesses 141 are respectively defined in two inner sides defining the slot so that the two flanges 13 are received in the two side recesses 141. Each rod 14 slidably and perpendicularly extends from the wing 12. A biasing member 145 is received between a bottom of the flanges 13 and a bottom defining the slot of each of the rods 14 so as to enhance the positioning between the wing 12 and the rod 14. Besides, referring to FIG. 9, a bolt 142 extends through two partitions separated by the slot of each of the rods 14 and a ring is connected to the biasing member 145 so that the two partitions clamp the wing 12. An end member 121 is further engaged with a distal end of each of the wings 12 to prevent the rods 14 from disengaging from the wings 12. When the wings 12 are received in the grooves 21 of the tube 20, a nut 24 is engaged with the threaded outside 22. A hydraulic tool 27 extends through the nut 24 and a pushing rod 272 as shown in FIG. 6 is engaged with the dent 11 of the pushing member so that when the swinging the lever 271 of the hydraulic tool 27 as shown in FIG. 7, the pushing member 10 is pushed toward the closed bottom of the tube 20, and the bearing 40 is moved along the shaft 41. The hydraulic tool 27 can be released by operating the valve 273. Referring to FIG. 5, it is to be noted that the rods 14 each have a curved inside 143 which is able to contact the circular outside of the shaft 41. As shown in FIG. 8, the distal end of the pushing rod 272 is a rounded end 270 so that it is convenient for the operator to engage the pushing rod 272 with the pushing member 10 without additional aligning process. FIGS. 14 and 15 show that the biasing member 146 can be a ring-shaped spring which engaged between the bottom of the flanges 13 and the bottom defining the slot of the rod 14. The bolt 142 extends through the two partitions separated by the slot of each of the rods 14 and the ring-shaped biasing member 146 so that the two partitions clamp the wing 12.

Figure 10:
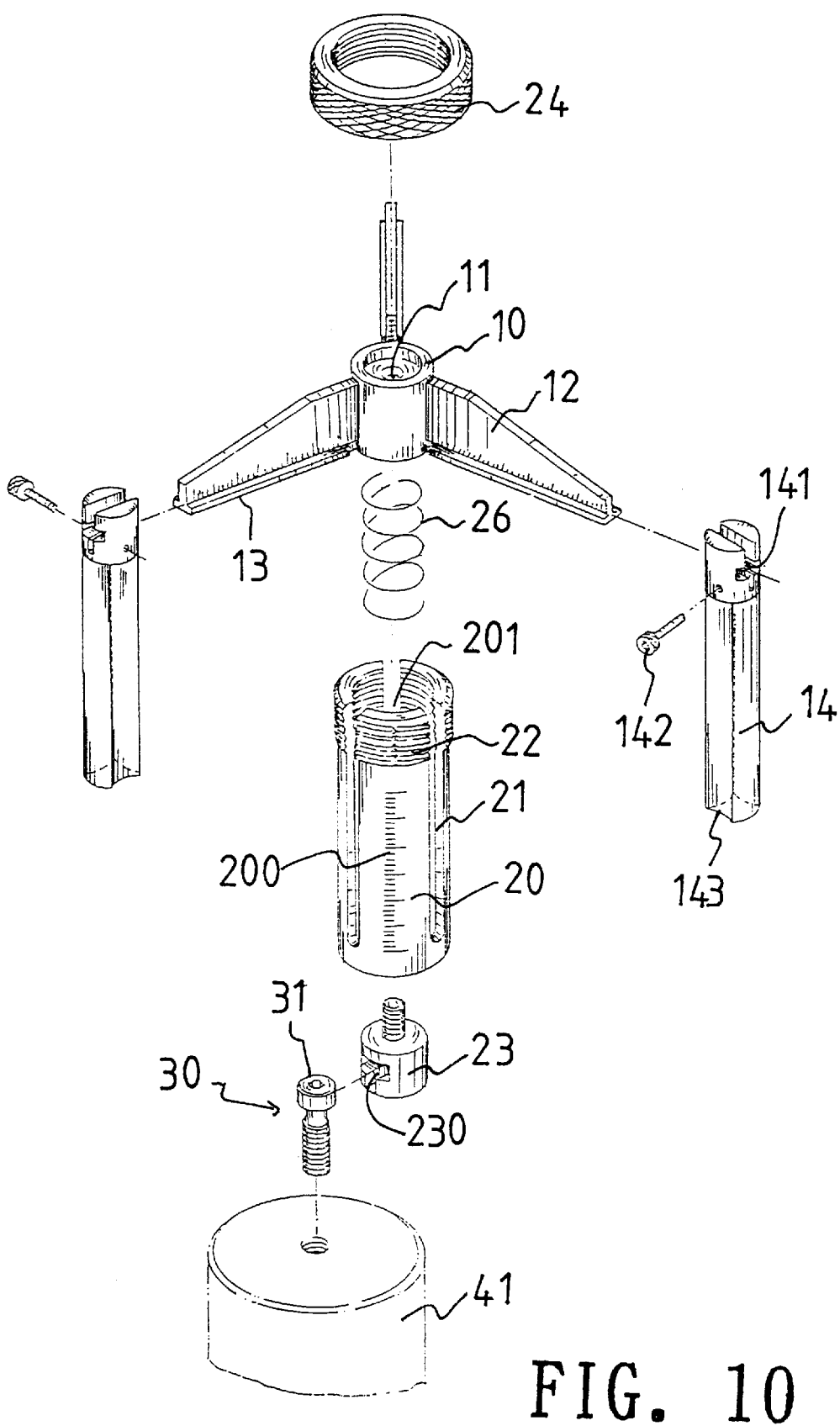
FIG. 10 is an exploded view to show another embodiment of the device for mounting a bearing onto a shaft in accordance with the present invention.
Figure 11:
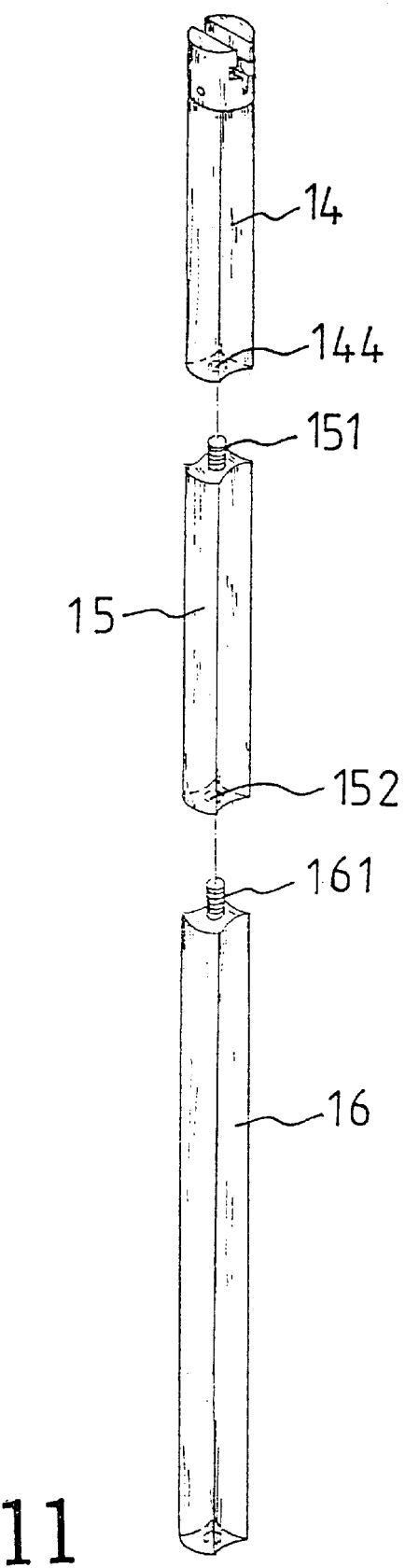
FIG. 11 shows that each rod of the device can be extended by connecting extension rods.
Figure 12:
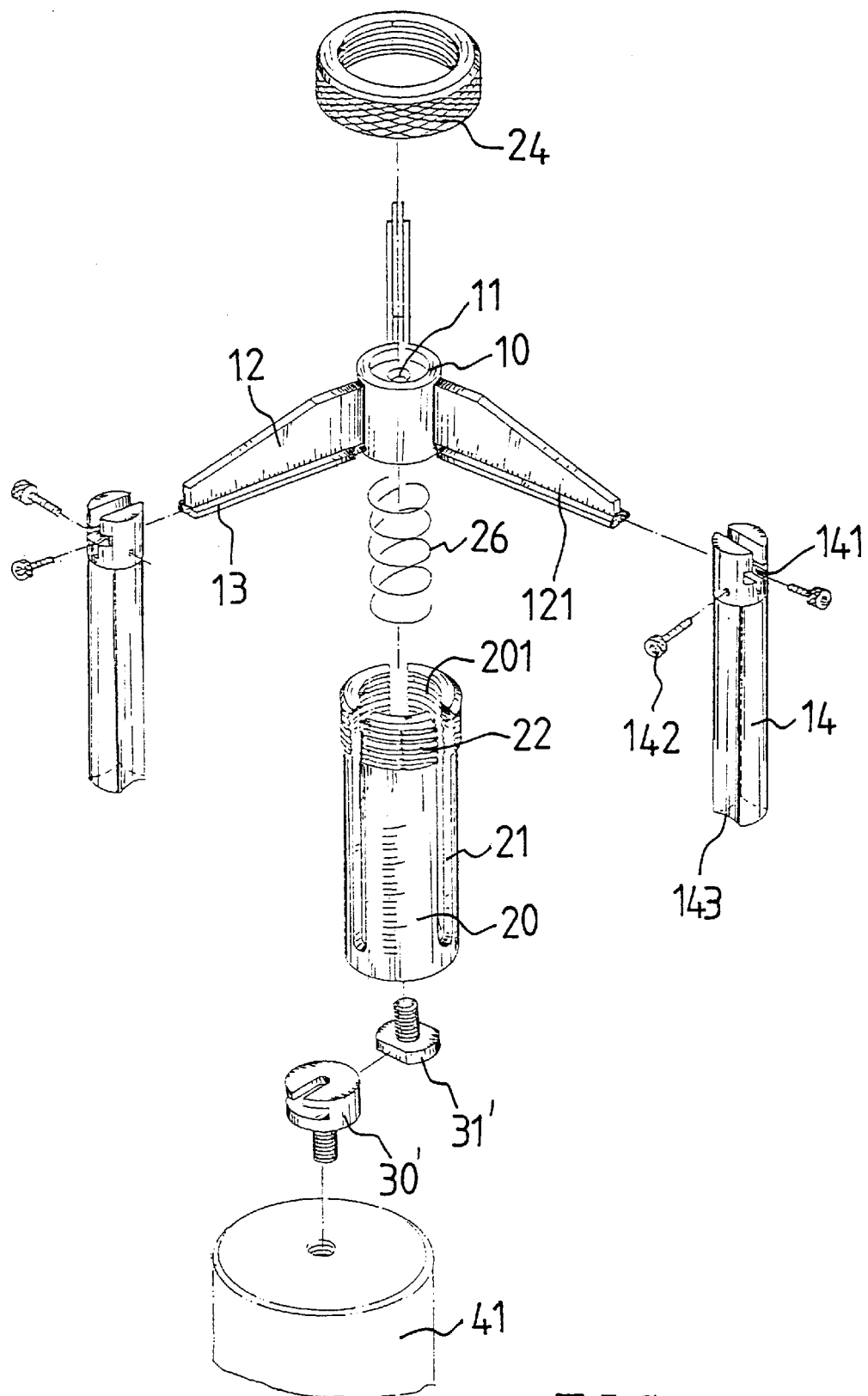
FIG. 12 is an exploded view to show another embodiment of the engaging means in accordance with the present invention.
Figure 13:
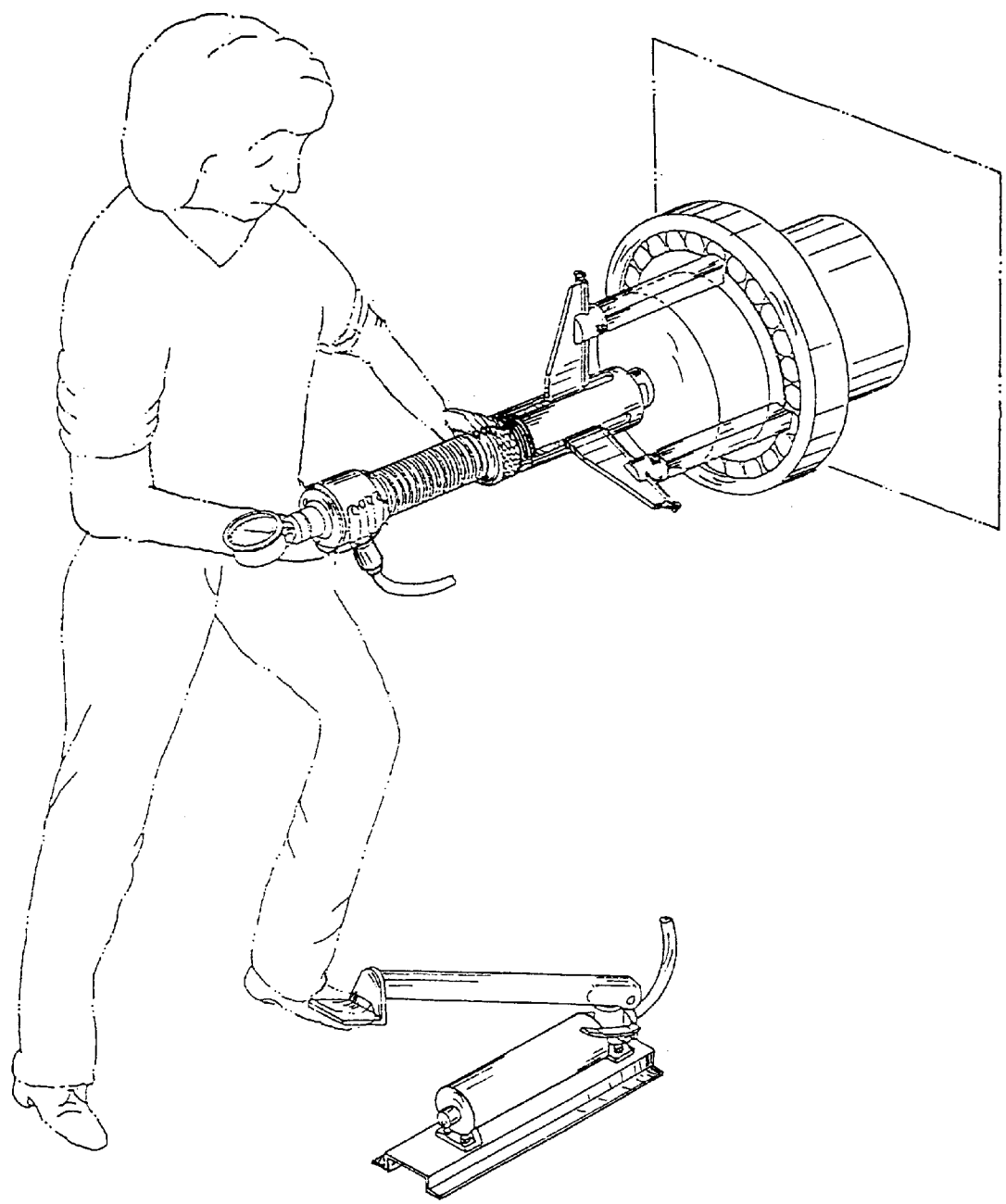
FIG. 13 shows that an operator uses the device of the present invention to install a bearing onto a shaft.

Referring to FIG. 10, the engaging means may be designed that the first part 23 has a concavity 230 defined radially therein and the second part 30 has a head 31 which is received in the concavity 230. The wings 12 each have marks 121 thereon to show the distance that the rod 14 is moved. The tube 20 has marks 20 thereon so as to easily observe the distance that the pushing member 10 moves. FIG. 11 shows that the length of the rod 14 can be extended by adding extension rods 15, 16 to the rod 14. The extension rod 15 has a threaded portion 151 on one end thereof so as to engaged with a threaded recess 144 in the rod 14. The extension rod 16 has a threaded portion 161 on one end thereof so as to engaged with a threaded recess 152 in the extension rod 15. FIG. 12 shows another embodiment of the engaging means wherein the first part has an oval flat head 31' and the second part 30' has a concavity 30' to receive the oval flat head 31'.

While we have shown and described various embodiments in accordance with the present invention, it should be clear to those skilled in the art that further embodiments may be made without departing from the scope and spirit of the present invention.

What is claimed is:

1. A device for mounting bearings onto a shaft, comprising:
    a tube having a closed bottom and an open end, at least two grooves defined longitudinally in said tube and communicating with said open end, an engaging means on said closed bottom of said tube and adapted to be connected to the shaft;
    a pushing member having at least two wings extending radially outward therefrom and said at least two wings movably received in said at least two grooves, each of said at least two wings having a rod slidably and perpendicularly connected thereto, and
    a hydraulic pushing rod pushing said pushing member toward said closed bottom of said tube.

2. The device as claimed in claim 1 further comprising an end member engaged with a distal end of each of said at least two wings to prevent each of said at least two rods from disengaging from said at least two wings.

3. The device as claimed in claim 1 further comprising a spring urged between said pushing member and said closed bottom of said tube.

4. The device as claimed in claim 1, wherein said pushing member has a dent defined in one of two ends thereof so that said hydraulic pushing rod is engaged with said dent.

5. The device as claimed in claim 1 further comprising a threaded outside defined in said open end of said tube and a nut is engaged with said threaded outside.

6. The device as claimed in claim 1, wherein said engaging means includes a first part connected to said closed bottom of said tube and a second part adapted to be connected to the shaft, said first part having a head and said second part having a concavity defined radially therein so as to receive said head in said concavity.

7. The device as claimed in claim 1, wherein said engaging means includes a first part connected to said closed bottom of said tube and a second part adapted to be connected to the shaft, said first part having a concavity defined radially therein and said second part having a head which is received in said concavity.

8. The device as claimed in claim 1, wherein each of said at least two rods has a curved inside which is adapted to contact the shaft.

9. The device as claimed in claim 1, wherein each of said at least one wings has two flanges extending laterally therefrom and each of said at least two rods has a slot defined in a top thereof, two side recesses respectively defined in two inner sides defining said slot and said two flanges received in said two side recesses.

10. The device as claimed in claim 9 further comprising a biasing member received between said flanges and a bottom defining said slot of each of said at least two rods.

11. The device as claimed in claim 9 further comprising a bolt extending through two partitions separated by said slot of each of said at least two rods so that said two partitions clamp respective one of said at least two wings.

12. The device as claimed in claim 11, wherein said biasing member is a ring-shaped spring and said bolt extends through said ring-shaped biasing member.

* * * * *